a2

United States Patent
Hess

(10) Patent No.: US 9,446,858 B2
(45) Date of Patent: Sep. 20, 2016

(54) APPARATUS AND METHODS FOR TETHERED AERIAL PLATFORM AND SYSTEM

(71) Applicant: Kevin Hess, Ponte Vedra Beach, FL (US)

(72) Inventor: Kevin Hess, Ponte Vedra Beach, FL (US)

( * ) Notice: Subject to any disclaimer, the term of this patent is extended or adjusted under 35 U.S.C. 154(b) by 0 days.

(21) Appl. No.: 14/858,467

(22) Filed: Sep. 18, 2015

(65) Prior Publication Data

US 2016/0083115 A1 Mar. 24, 2016

Related U.S. Application Data

(60) Provisional application No. 62/052,289, filed on Sep. 18, 2014, provisional application No. 62/052,946, filed on Sep. 19, 2014.

(51) Int. Cl.
*B64F 3/02* (2006.01)
*B64C 39/02* (2006.01)
*G08G 5/00* (2006.01)

(52) U.S. Cl.
CPC ............... *B64F 3/02* (2013.01); *B64C 39/022* (2013.01); *B64C 39/024* (2013.01); *G08G 5/0013* (2013.01); *B64C 2201/127* (2013.01); *B64C 2201/148* (2013.01)

(58) Field of Classification Search
CPC .............................. G06F 17/00; B64C 39/02
See application file for complete search history.

(56) References Cited

U.S. PATENT DOCUMENTS

| 8,738,198 | B2* | 5/2014 | Schempf | B25J 11/002 701/2 |
|---|---|---|---|---|
| 9,174,733 | B1* | 11/2015 | Burgess | B64D 1/12 |
| 2003/0136874 | A1* | 7/2003 | Gjerdrum | B64D 39/00 244/10 |
| 2012/0091259 | A1* | 4/2012 | Morris | B64C 27/02 244/17.13 |
| 2012/0112008 | A1* | 5/2012 | Holifield | B64C 27/02 244/155 A |
| 2013/0233964 | A1* | 9/2013 | Woodworth | B64C 37/02 244/2 |
| 2014/0183300 | A1* | 7/2014 | MacCulloch | B64C 39/024 244/1 TD |
| 2015/0184637 | A1* | 7/2015 | Vander Lind | F03D 7/0204 290/44 |

* cited by examiner

*Primary Examiner* — Thomas Tarcza
*Assistant Examiner* — Alex C Dunn
(74) *Attorney, Agent, or Firm* — Thomas C. Saitta

(57) ABSTRACT

A drone system includes a drone that includes a propulsion system, a flight stabilizer system, and an air payload interface unit, and a camera system, wherein the camera system includes a camera stabilizing unit, and a ground support system to which the drone is detachably coupled through a tether unit, and for providing electrical power to the propulsion system. The drone system further includes a ground payload interface unit for receiving and transmitting command and telemetry information to the air payload interface unit through the tether unit, and a controlling device for controlling the propulsion system and the camera system through the tether unit.

18 Claims, 5 Drawing Sheets

APPARATUS AND METHODS FOR TETHERED AERIAL PLATFORM AND SYSTEM

CROSS REFERENCES TO RELATED APPLICATIONS

The present application claims the priority of provisional patent application 62/052,946 filed on Sep. 19, 2014 and provisional patent application 62/052,289 filed on Sep. 18, 2014. All of the subject matter and material set forth in each of the above listed provisional patent applications is incorporated herein by reference as if each had been set forth herein in full.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

The use of commercial drones has exploded across a number industries in recent years. Some have already been adapted to deliver pizzas, monitor endangered species and provide spectacular panoramic shots for film and journalistic purposes.

In a 2014 study from the aerospace industry specialists, the Teal Group, estimated that spending on UAVs would grow from the current $6.4 billion annually to $11.5 billion within the next decade—although much of these figures were accounted for by military spending.

Most of the fascination with civilian drones has focused on those that engage in free flight, orbiting or hovering over news according to commands given by their drone operators ("DROPs"), aided by onboard autonomous navigation systems.

However, free-flight drones have their risks. Whether it be hacking, loss of a signal, a line of coding gone wrong or the machine simply flying away, for a time he thought there was too much potential for failure. One of the main problems of UAV drones stem from their principle of control: if the radio signal is lost it may compromise the success of the mission.

Furthermore, under such conditions it may quickly become impossible to retrieve the equipment back, except for those scenarios when flying robotic platforms possess a capability to automatically track their way back home.

This issue is especially sensitive in the military and rescue operations where the signal may be jammed deliberately or lost due to signal attenuation behind thick walls or in under the piles of rubble. So what is the best way to overcome this apparent limitation?

Equipping drones with more powerful transceivers probably is not an option as any signal transmission requires power, and a stronger signal means quicker depletion of batteries. Also, stronger signals may cause interference with other electronic devices, while the technology itself is still not immune to even relatively simple electromagnetic jamming.

In the world of sports broadcasting they have been successfully employed to provide new, detailed coverage of fast-moving events taking place over a large area.

Broadcasts for the likes of surfing, skiing and sailing—all sports that are difficult for spectators to follow in detail from afar or in a stationary position—have benefited from the addition of spectacular aerial footage. However, the use of free-flight drones in such circumstances continues to suffer from the above drawbacks and problems.

In addition, typical drones have an on-board fuel storage. As such, FAA will not allow them to enter controlled airspace areas. Moreover, typical drones cannot remain in the air for a desirably lengthy time period because their fuel tanks can't store a suitable large quantity of fuel.

Typical aerostats are secured to an object/body on the ground by a tether. One end of the tether is attached to the aerostat and another end of the tether is attached to the object that is securely stationed on the ground. The tether holds the aerostat in place over a particular area. As known to one of ordinary skill in the art, an aerostat is not equipped with a propulsion device and a flight controller and, therefore cannot self-navigate over the particular area.

Using conventional aerostats for aerial photography and surveillance is difficult, because aerostats allow little operator control. Positioning the camera to maintain a picture frame is difficult as an aerostat position is affected by wind. The ability to maneuver and rotate an aerostat is limited. Shifting winds require repositioning of the aerostat and tether line to maintain a picture frame. Moreover, much operator effort is required to keep the tether line and other aerostat components from blocking or falling into the picture frame.

Therefore, a need exits for an electric tethered aerial platform ("ETAP") that can remain in the air as long as desired while maintaining a desirable picture frame, provide data transmission in any of a number of modes such as radar, sonar, infra-red detection, surveillance and any other device or system that would benefit from being elevated.

There is also a need for an ETAP system comprising multiple sub-systems designed for the purposes of elevating a sensor, transmitter or other devices to altitudes higher than 20 feet and lower than 1500 feet for long-durations.

There is a further need for an ETAP to be capable of use in news gathering, sports viewing, extreme activity monitoring, surveillance in remote areas, information gathering such as a fire, a major vehicle accident, a natural disaster, or a police standoff, and such mundane, but important items as morning and evening rush time data and blockages.

The needs are numerous and may include it providing a 'permanent stare' that can be streamed. That can be useful to cover any event that unfolds over hours, days, or weeks.

There is also the need to provide a system that has the capability of streaming very high definition video in real time, completely secure from misappropriation, jamming, or spoofing.

There is a further need for an ETAP system and platform to provide optical and/or infrared and/or high definition sensor data for use in the following exemplary fields:

Search and rescue to ascertain, provide real time data related to and respond to: a) situational awareness of responder assets and position, b) determine location of survivors, c) mapping of passable roads, lanes.

Law enforcement to ascertain, provide real time data related to and respond to: a) crowd safety, b) hostage situation monitoring, c) warrant serving recon.

Military to ascertain, provide real time data related to and respond to: a) force protection: b) convoy escort, c) IED detection and suppression.

Commercial to ascertain, provide real time data related to and respond to: a) news gathering, b) energy infrastructure inspection, c) agriculture.

BRIEF SUMMARY OF THE INVENTION

Disclosed herein is a system that includes a portable tethered drone.

Further disclosed herein is a system that comprises the ETAP.

According to one aspect of the invention, the drone system includes a drone that includes a propulsion system, a flight stabilizer system, and an air payload interface unit, and a camera system, wherein the camera system includes a camera stabilizing unit, and a ground support system to which the drone is detachably coupled through a tether unit, and for providing electrical power to the propulsion system. The drone system further includes a ground payload interface unit for receiving and transmitting command and telemetry information to the air payload interface unit through the tether unit, and a controlling device for controlling the propulsion system and the camera system through the tether unit.

According to another aspect of the invention, the ETAP drone system may include sensors and processors that detect and sense and/or record and/or respond and/or deliver information relative to a visual event, an audio event, a radiation level, a chemical level, a heat level, an electromagnetic signature, a pressure level, a reflective signature, a geo-position coordinate, a homing beacon signal or some other event that the operator has determined is worthy of detection through event-appropriate sensors.

According to another aspect of the invention, the ETAP drone system includes 1) an airborne vehicle with a) propulsion system, b) a flight control and stabilizer system, main power supply unit, c) a single, combined or multitude of sensor, radar, transmitter, or other devices which benefit from being elevated, and 2) tether tension control system, 3) Ground Power Module and Interface Unit ("GPMIU"), 4) ground battery bank which always functions as backup power and may function as primary power.

According to a still further aspect of the invention, the ETAP uses a tether for multiple purposes which include, but are not limited to, 1) physically restraining the airborne vehicle, 2) providing power from the ground to the airborne vehicle, and/or 3) providing means of digital communications to and from the airborne vehicle without the requirement of a wireless device, or radio.

According to a yet a still further aspect of the invention, the ETAP employs a novel tether tension control system that ensures that the tether does not become entangled with objects foreign to the operating environment. It is still another aspect of the invention that it employs a novel winch control system that has an electrical, constant contact slip ring apparatus that enjoins a spinning side and a stationary side together.

In yet a further aspect of the invention, the system, platform and methods of use to provide numerous benefits which include, but are not limited to; 1) longer duration continuous flights compared to similar vehicles operating from on-board batteries, 2) safer operation due to the tether restricting unintended movement, 3) reduced operator mistakes and fatigue due to reduced workload as the system does not navigate waypoints, does not require battery management, has a more broad flight envelope resulting in less mishaps, and/or 4) communications that use the tether and therefore cannot be hacked and will not conflict with nearby radios.

According to one aspect of the invention the system, platform and methods of use to provide numerous benefits which include, but are not limited to a simplified system control via a hand held HID (human interface device) which instructs the ETAP drone to certain flight maneuvers such as launch, yaw control and land.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

BRIEF DESCRIPTION OF THE DRAWINGS

In the accompanying figures, like reference numerals refer to identical or functionally similar elements throughout the separate views.

Figure 1:
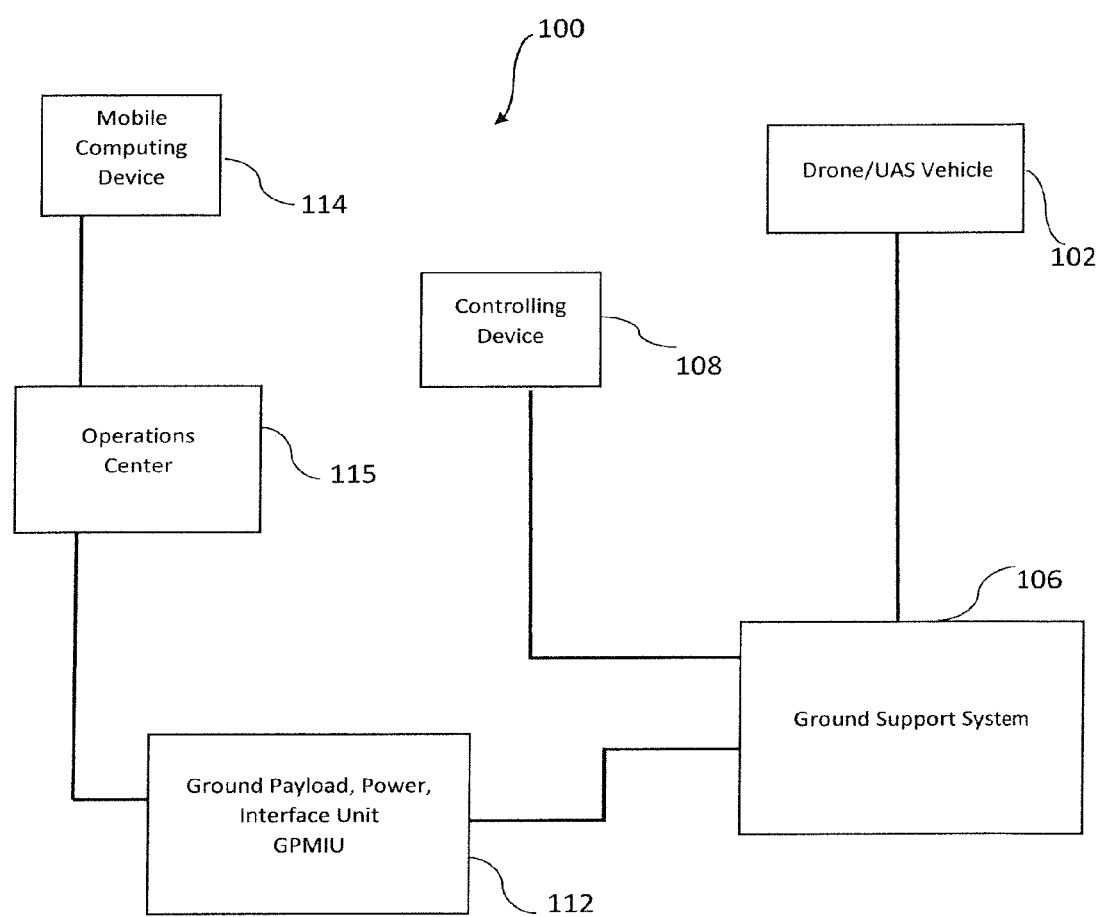
FIG. 1 illustrates a block diagram of an exemplary portable tethered aerial platform drone system in accordance with an aspect of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF AN EMBODIMENT OF THE INVENTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In accordance with the present disclosure, a portable tethered drone system is a system that can be stored in a container, such as a pelican case. Alternatively, the system may be stored in more than one pelican case. The portable tethered drone system can be powered electrically by a vehicle, or by an external power supply.

FIG. 1 illustrates an exemplary portable tethered drone system 100 in accordance with the present disclosure. As shown, system 100 includes a drone 102, a tether 104, a ground support system 106, a controlling device 108, and a ground payload, power and interface unit 112.

In accordance with the present disclosure, the flying tethered drone 102, which may also be referred to as a UAS vehicle, which is remotely piloted through a tether line 104 by means of the control device 108 and by data provided by the ground payload, power and interface unit 112, includes a propulsion system, a flight stabilizer system, and an air payload interface unit (APIU). Moreover, the tethered drone 102 includes a camera system, which includes a camera stabilizing unit, comprising for example a stabilized camera sensor. In one implementation, the stabilized camera sensor may be an all-weather camera stabilizing gyroscope.

The tether 104 includes two copper conductors in a twisted pattern with a protective sheathing of Kevlar-reinforced lattice pattern fabric. Accordingly, tethered drone system 100 includes a redundant power system. The protective layer allows air to pass over the conductors while providing strong resistance to ultra violet light, cuts, tears, tensile stretch, abrasion, and chemical exposure. Moreover, data can be transmitted to the drone 102 via the active conductors, i.e., over the pair of conductors. As such, a remote control of power and telemetry can be provided to the drone 102 via the tether 104. Moreover, the delivered power may be a multi-phase power signal.

In accordance with an implementation of the present disclosure, the ground support system 106 includes a set of batteries, a power charging system, an aircraft power system, and a tether winch.

Figure 5:
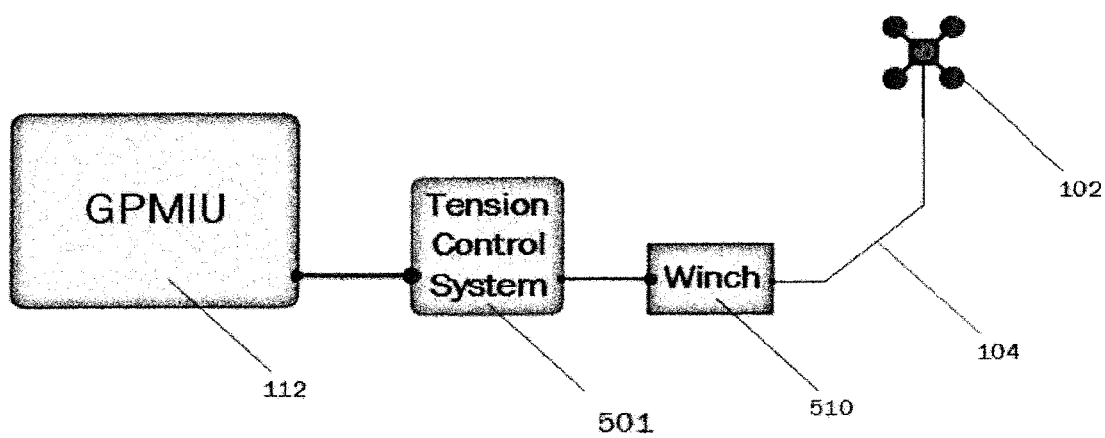
FIG. 5 illustrates a block diagram of an exemplary implementation of certain of the interconnections and monitoring aspects of a tethered aerial platform drone system in accordance with the present disclosure.

Referring to FIG. 5, a winch 510 is illustratively shown. The winch 510 is a mechanical device that reels in and reels out tether 104. The winch control system is configured to ensure that the tether 104 does not become entangled with objects foreign to an operating environment. Moreover, the winch control system includes a constant slip ring apparatus that enjoins a spinning side and a stationary side together.

The controlling device 108, which is connected to the drone 102 through the tether 104, is used by a user to trigger and control via action buttons a drone takeoff from the ground, a drone landing back to the ground, a change in drone's altitude, and a drone yawing.

The ground power module and interface unit or ground payload, power and interface unit (GPMIU) 112 is configured to send command signals to the APIU and to receive information about a status of the drone and video data from APIU. Moreover, as shown in FIG. 1, GPIU 112 is communicatively coupled to an operations center 115 through an HD communication network, such as an Ethernet, to provide photo and video data captured by the camera integral to the drone 102. In addition, GPMIU 112 is configured to provide a protected WI-FI network, which enables a user to use a mobile computing device 114 to remotely access data related to a status of the drone 102, of the telemetry, and view video captured by the drone camera. Moreover, using the mobile computing device 114, the user may control the drone and the drone camera by sending suitable command signals through the GPMIU 112. The mobile computing device 114 may be a mobile phone, a tablet, and the like.

Figure 2:
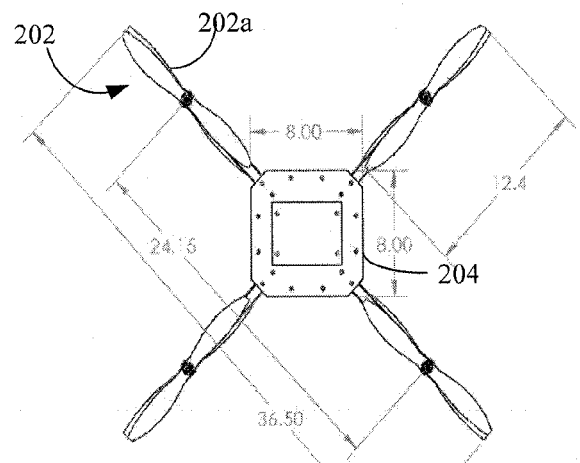
FIG. 2 illustrates a top view of an exemplary tethered aerial platform drone in accordance with an aspect of the present disclosure.
Figure 3:
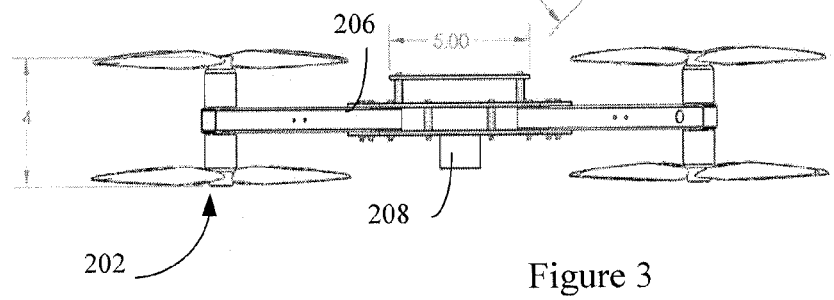
FIG. 3 illustrates a side view of the exemplary tethered aerial platform drone of FIG. 2 system in accordance with an aspect of the present disclosure.

Now referring to FIGS. 2 and 3, as shown, drone 102, which is an electric multi-rotor aircraft with two separate power supplies, includes a propulsion system of eight motors 202, which are coupled to a boom assembly 200. As shown, boom assembly 200 includes a center support 204 and four booms or beams 206, each of which extends from a corner of the four sided center support 204 and to each of which are coupled at a distant end from center support 204 two of the eight motors 202, arranged vertically as a top motor and a bottom motor.

In one implementation, booms 206 may be hollow structures to provide power to the electric motors 202, and may be formed from carbon-fiber or a like, sturdy lightweight material. As such, separate power and electronic speed control signals are provided to top motors and bottom motors of each boom 206.

Moreover, center support 204 includes a hollow extension 208 that extends from a lower surface 210, and which is configured for secure connection of the tether 104 to center support 204. Alternatively, hollow extension 208 may be a mounting tube that includes an engagement end for a top end of the tether 104. Though, drone 102 includes eight motors 202, drone 102 is configured to remain aloft through lift provided by one or more motors 202.

Figure 4:
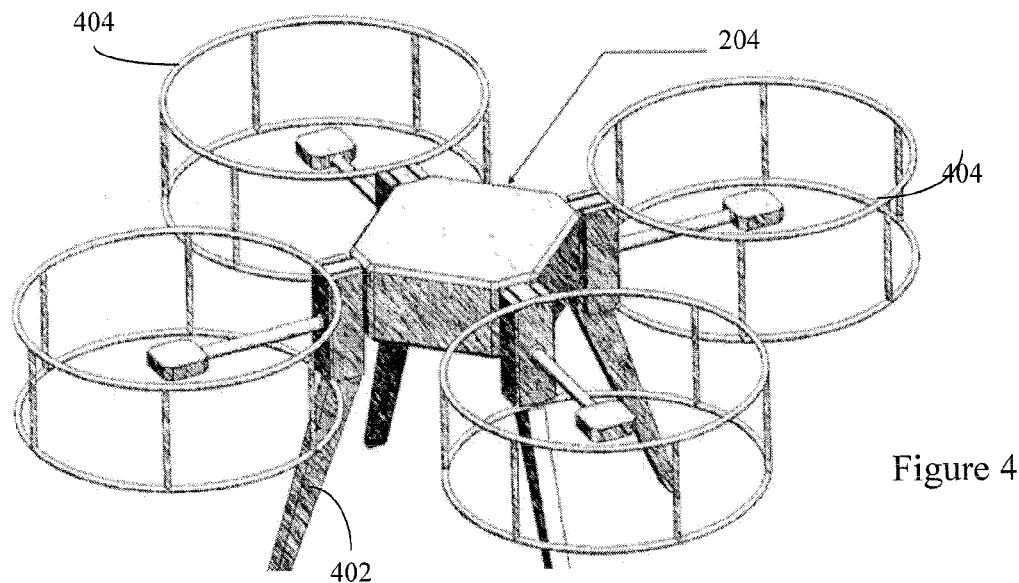
FIG. 4 illustrates a perspective view of another exemplary tethered aerial platform drone system in accordance with an aspect of the present disclosure.

As shown in FIG. 4, drone 102 further includes four legs 402 extending downward from each corner of center support 204. To protect the blades/propellers 202a from hitting a landing surface, a bottom end of each of the four legs 402 is lower than a low end of each propeller facing downwards. Moreover, drone 102 includes four cylindrical frames 404, each of which encloses diametrically and vertically a corresponding pair of propellers 202.

As stated above, unlike typical drones, drone 102 does not include onboard power to assuage FAA concerns. As such, drone 102 can enter controlled airspaces. Moreover, portable tethered drone system 100 may include sufficient redundancy and safety systems designed to address corporate risk management concerns, and telemetry over tether 104 ensures the flight control system cannot be hacked.

As stated above, portable tethered drone system 100 runs off electricity powered by a vehicle or an external power supply. Accordingly, prior to launching the drone 102, a user removes portable tethered drone system 100 from a pelican case (or cases) to be placed near a vehicle that has a 12 volt direct current (V DC) power supply or a 120 volt alternating current (V AC) power supply. Then, the user can plug in power to the pelican case from the vehicle as well as plug in a cord for data transmission coming from the sensor on the drone 102, wherein the data can be live video captured by the camera to transmit to a network.

Once plugged in, the user opens up the pelican case(s) to take out the drone 102, which as stated above includes an APIU and a stabilized camera sensor mounted thereon and configured to take the feed from the camera and send it down the tether line.

Once removed from the pelican cases, the user then mounts the drone 102 to a harness of the tether line 104 and lay the drone on the ground.

Subsequently, the user turns on the controlling device 108 or the mobile computing device 114 from the pelican case and turn on some switches and activate the drone system 100 where the drone 102 will start up and lift while taking tether line 104 from the winch mounted inside the pelican case. Once at a target operating altitude level, the drone 102 may hold its position and through a laptop and remote control the camera can be controlled by a remote or local user, and the footage is provided via the cable that was plugged into the case originally.

Once the desirable activity by the drone 102 is completed, using the controlling device 108 or the mobile computing device 114 the user can bring the drone 102 down and pack it back into the pelican case(s).

In one exemplary implementation of the present disclosure and invention, the portable drone system 100 is configured to provide UAS airborne drone vehicle 102 instructions via a server having a processor and a memory, the memory storing instructions executable by the processor such that the server is configured to cause the generation of a flight mode and/or pattern whereby the UAS airborne drone vehicle 102 automatically follows a moving ground control station or equipment associated therewith through the use of a differential GPS and optical alignment system.

Accordingly, UAS airborne drone vehicle 102 can use optical flow methodology to align the UAS airborne drone vehicle 102 with a ground target consisting of a pattern that is designed to determine UAS airborne drone vehicle 102 orientation relative to a host vehicle, ground target or other determined destination point, either fixed or variable.

This system and related server is configured to utilize a 2D printed pattern that imparts a 3D special position measurement. In combination with the GPS, the system can maintain a less than 20 cm resolution for position keeping with a moving target, host vehicle, ground target or other determined destination point, either fixed or variable.

In the event that there is a GPS denial or outage environment, the system and related server will deliver instructions via the server such that the memory storing instructions executable by the processor will cause the generation of a flight mode and/or pattern where the primary use of optical flow methodology will be employed for maintaining the position and orientation of the UAS airborne drone vehicle 102 relative to the host vehicle, ground target or other determined destination point, either fixed or variable. In addition, the system uses transient voltage of 800 Vdc from the ground to the UAS airborne drone vehicle 102.

Now referring to FIG. 5, there is illustratively shown a block diagram of an exemplary implementation of certain of the interconnections and monitoring aspects of a tethered aerial platform drone system in accordance with the present disclosure.

A tether tension control system 501 maintains appropriate tension on the tether 104 and supply to the UAS airborne vehicle. The tether tension control system 501 comprises multiple sub-components. The winch 510 is illustratively described as having one or more of the following components and attributes in order to permit it to handle the complex aspects that are necessary or desirable to fulfill its function.

The components and attributes may include a level wind mechanism (not shown), electric slip ring (not shown), load cell (not shown), signal amplifier (not shown), DC motor (not shown), DC motor controller with software programming (not shown), pulleys for guiding the tether (not shown), belts (not shown), gears and other mechanical transmission parts (not shown). While these components and their arrangement form a part of the invention, the particular components are within the knowledge of persons of ordinary skill in the relevant arts who will recognize that the invention may comprise fewer features than illustrated in any individual embodiment described above. The components set forth above and described herein are not meant to be an exhaustive presentation of the ways in which the various features of the invention may be formed or combined.

Figure 6:
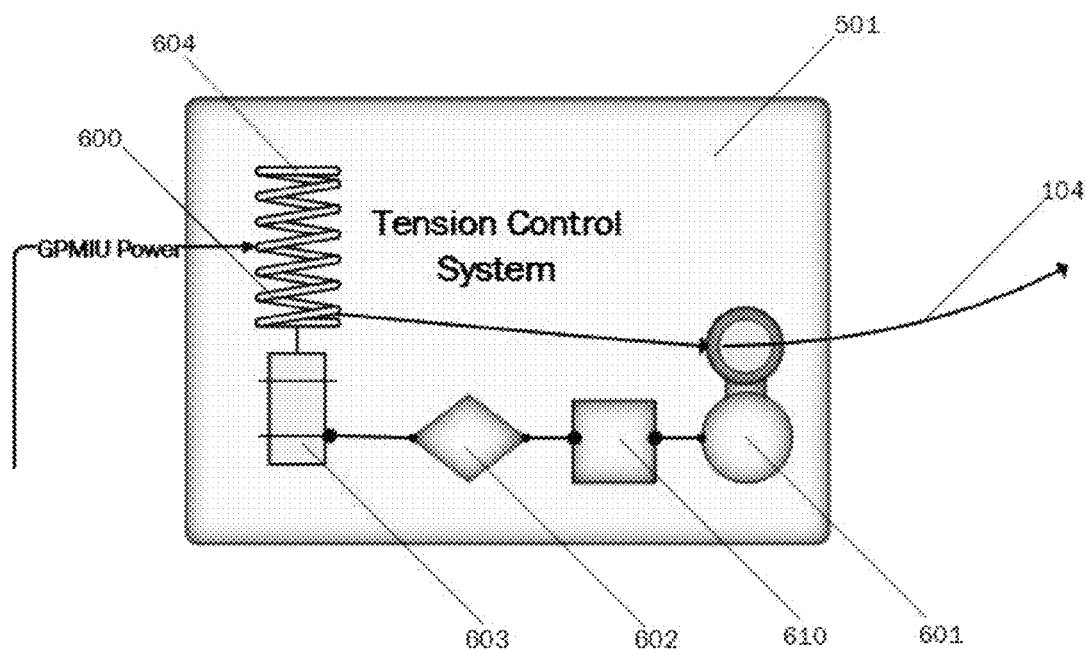
FIG. 6 illustrates a block diagram of an exemplary implementation of a tension control system for a tethered aerial platform drone system in accordance with an aspect of the present disclosure; and, FIG. 7 illustrates a block diagram of an exemplary implementation of a GPMIU for a tethered aerial platform drone system in accordance with an aspect of the present disclosure Elements in the figures are illustrated for simplicity and clarity and have not necessarily been drawn to scale. For example, the dimensions of some of the elements in the figures may be exaggerated relative to other elements. Further, the apparatus, method and system components have been represented, where appropriate, by conventional symbols in the drawings.

Referring to FIG. 5 and FIG. 6, the winch 510 utilizes a load cell 601 coupled with a signal amplifier 610 as input signal to a motor controller 602. The motor controller 602 pulses the DC motor 603, which turns a spool 604 which holds the tether 104. Software in the motor controller 602 is configured and tuned to load cell 601 inputs for adjusting the force on the tether 104 required to reel in or reel out tether line.

There can be advantageously deployed multiple modes to the motor controller 602. Illustratively, these may include:

1) Manual mode whereby the automatic tension control routines are disabled and the operator may reel in and reel out tether as needed. This mode is may be used during setup operations and/or may be used to recover an airborne vehicle which is not responding to ground control system instructions or has failed to execute fail-safes. This process is called an emergency vehicle recovery.

2) Automatic mode, whereby the motor controller adjusts for tether tension and supply.

3) Fail-safe mode, whereby the operator or flight controller initiates an emergency stop to the motor controller to disable movement of the spool (similar to manual mode, however, automatic fail-safe is initiated by the flight controller and stops all movement of the spool).

The ground payload, power and interface unit 112 is configured to send, via a processor, command signals to the APIU, through hardware, software or any combination of hardware and software suitable for the particular application, and to receive information about a status of the drone and video data from APIU through input power and data connection 600. Although a single connection and line is illustratively shown in FIG. 6, it will be appreciated that more than one line or connection may be employed, thus isolating the power from the data connection or providing multiple data connections, based upon the sensor, data collection or other device that the line is connected to, obtaining data from or providing data to.

Figure 7:
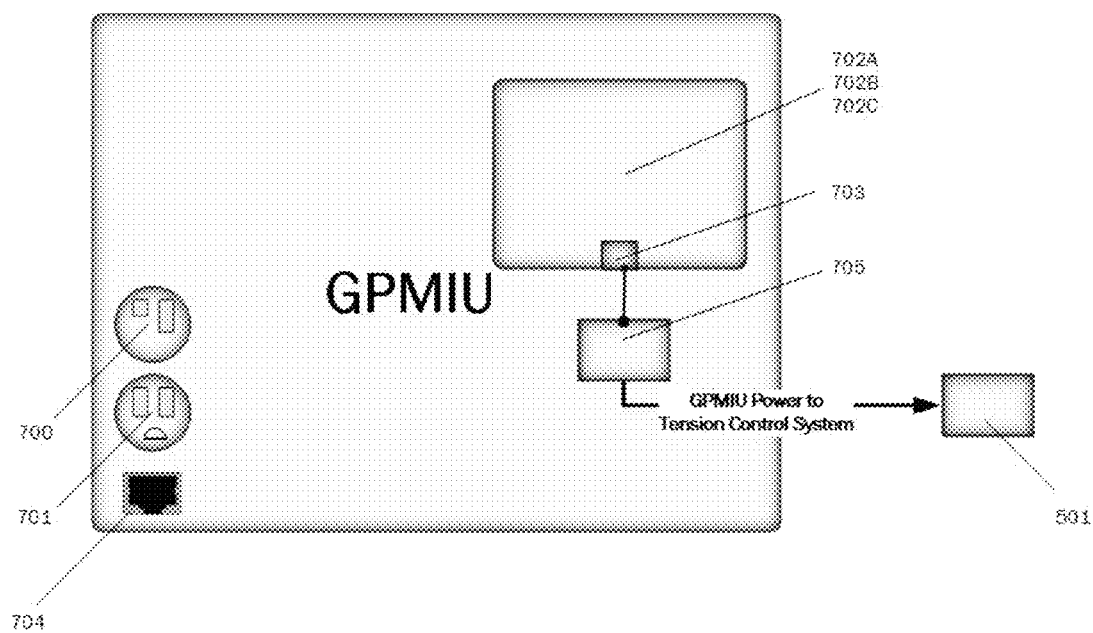

Referring to FIG. 5 and FIG. 7, there is shown a more detailed example of ground payload, power and interface unit 112 and certain of its component parts. The ground payload, power and interface unit 112 is the power supply and communication to the UAS airborne vehicle 102.

Power input may be provided by any one or more of a number of means, either separately or alternatively such that there is both a primary and back-up to ensure that there is continuous and reliable power provided to the ground payload, power and interface unit 112 and the UAS airborne vehicle 102.

Power may be provided via generator, line power or other source of AC or DC current. Thus, a DC power supply 700 that can be advantageously employed is a battery bank that can be utilized to power the inverter. In the event of AC power failure, the battery bank 700 will immediately handle the power demand of the system.

An AC power source 701 can be utilized to power the inverter. An illustrative AC power source can be a standard 120 VAC, 50-60 Hz or a specially constructed unit for military or other applications. In the event of DC power failure, the AC power source will take over providing the power to the ground payload, power and interface unit 112 and the UAS airborne vehicle 102 and thereby immediately handle the power demand of the system.

In one example, the AC power source 701 can employ an AC voltage range of 110-240 VAC, 50-60 Hz and DC supply 700 can employ a voltage range of 48 vdc to 400 vdc and may, in some instances, use transient voltage of 800 vdc from ground to the ETAP aerial vehicle 102.

The GPMIU comprises multiple sub-systems that provide reliable power to the airborne vehicle 102 and Ethernet-like IP communications.

In FIG. 7 there is shown a GPMIU inverter 702A which absorbs AC and DC inputs. The GPMIU inverter 702A outputs high voltage DC to power the tension control module and UAS. While the specific example is described in terms of a GPMIU inverter 702, the power conversion module, of which the GPMIU inverter 702A is an example, is in series for failover and redundancy to permit the module to convert input voltage and current to output voltage and current over the tether. Input from internal or external batteries which can be used as a primary source of current and are always used as an automatic and uninterruptible fail-safe backup source of current.

In FIG. 7 there is also shown an amplifier 702B which may be employed to increase the DC voltage. There is also shown a DC power charger 702C for internal or external batteries. Thus, if the AC power source is active, the GPMIU battery charger 702C is able to charge the DC power source. If the AC power source fails, the DC input handles the burden of powering the system.

FIG. 7 also has illustratively depicted a GPMIU inverter output 703 which is a a high voltage DC output that is sent to the tension control system 201 to be relayed to the UAS 104.

In FIG. 7 there is further shown as part of the ground payload, power and interface unit 112 a GPMIU Ethernet-like IP connection 704 which is a wired connection branching from the GPMIU 112 to provide telemetry information, vehicle control, and UAS health and activity monitoring. This may be carried via frequency modulation over active conductors for IP based data communications.

Referring again to FIG. 7, there is illustrated in block form a GPMIU Data Injector 705 which may be employed to capture data from the UAS 104 and to provide information about the UAS 104 as well as permit the use of that data in a feedback system to permit the operation and modification of the tension control system and UAS.

In operation, the ETAP aerial vehicle 102 may also employ a "follow me" flight mode whereby the ETAP aerial vehicle 102 automatically follows the moving ground control station equipment through the use of differential GPS as well as optical alignment systems. The ETAP aerial vehicle 102 uses optical flow methodology and program instructions to align itself with a ground target consisting of pattern that is designed to determine the ETAP aerial vehicle 102 orientation relative to host vehicle or ground target.

The methods and systems described herein may be employed in relation to a single UAS airborne drone vehicle or multiple UAS airborne drone vehicles which may be independent or form a grid or node system to oversee expanded areas and can either communicate to a central station or to one another or a combination of the two.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application.

By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, cloud servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, cloud servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

In the foregoing specification, specific embodiments have been described. However, various modifications and changes can be made without departing from the scope of the claims herein. For example, method steps are not necessarily performed in the order described or depicted, unless such order is specifically indicated.

Accordingly, the specification and figures are to be regarded in an illustrative rather than a restrictive sense, and all such modifications are intended to be included within the scope of the claims. various modifications and improvements thereon will become readily apparent to those skilled in the art. The spirit and scope of the present disclosure is not to be limited by the foregoing examples, but is to be understood in the broadest sense allowable by law.

All documents referenced herein are hereby incorporated by reference.

What is claimed is:

1. AN ETAP drone system comprising: a drone having a propulsion system, a flight stabilizer system, an air payload interface unit, and a camera system, wherein the camera system includes a camera stabilizing unit; a ground support system to which the drone is detachably coupled through a tether unit, said tether unit providing electrical power to the propulsion system; a ground payload, power and interface unit for receiving and transmitting command and telemetry information to the air payload interface unit through the tether unit; and a controlling device for controlling the propulsion system and the camera system through the tether unit; and further comprising: a winch operatively coupled to the tether unit and a winch control system configured to receive command information to ensure that the tether unit does not become entangled with objects foreign to an operating environment; in which the winch control system includes a constant slip ring apparatus that enjoins a spinning side and a stationary side together.

2. AN ETAP drone system in accordance with claim 1 further comprising a camera output receiving unit for receiving at least one information signal from the camera system.

3. AN ETAP drone system in accordance with claim 2 further comprising a camera information transmitting system.

4. AN ETAP drone system in accordance with claim 1 further comprising: a winch operatively coupled to the tether unit and a winch control system configured to receive command information to ensure that the tether unit does not become entangled with objects foreign to an operating environment.

5. AN ETAP drone system comprising: a drone having a propulsion system, a flight stabilizer system, an air payload interface unit, and a camera system, wherein the camera system includes a camera stabilizing unit; a ground support system to which the drone is detachably coupled through a tether unit, said tether unit providing electrical power to the propulsion system; a ground payload, power and interface unit for receiving and transmitting command and telemetry information to the air payload interface unit through the tether unit; and a controlling device for controlling the propulsion system and the camera system through the tether unit.

6. AN ETAP drone system in accordance with claim 1 in which the propulsion system is comprised of at least one propeller and electric motor for providing thrust.

7. AN ETAP drone system in accordance with claim 1 further comprising: an event detection system, wherein the event detection system includes at least one event detection sensor unit; said controlling device further controlling the event detection system and the at least one event detection sensor unit through the tether unit.

8. AN ETAP drone system in accordance with claim 7 in which the event detection system is selected from the following group of events: visual event, an audio event, a radiation level event, a chemical level event, a heat level event, an electromagnetic signature event, a pressure level event, a reflective signature event, a geo-position coordinate event and/or a homing beacon signal event and the at least one detection sensor unit is capable of detecting the event.

9. AN ETAP drone system in accordance with claim 7 in which the detection sensor unit is selected from the following group of sensors: visual, audio, infrared, broad spectrum, single frequency, multiple harmonic frequency, heat, chemical level, chemical presence, radiation level, heat level, electromagnetic signature, pressure, reflective signature, geo-position coordinate and/or homing beacon.

10. AN ETAP drone system comprising: a drone having a propulsion system, a flight stabilizer system, an air payload interface unit, and a camera system, wherein the camera system includes a camera stabilizing unit; a ground support system to which the drone is detachably coupled through a tether unit, said tether unit providing electrical power to the propulsion system; a ground payload, power and interface processor unit for receiving and transmitting command and telemetry information to the air payload interface unit through the tether unit; and a controlling device for controlling the propulsion system and the camera system through the tether unit; and further comprising a computer server that includes a processor and a memory, the memory storing instructions executable by the processor such that the server is configured to: to cause the generation of a flight mode and/or pattern whereby the drone automatically follows a moving ground control station or equipment associated therewith through the use of a differential GPS and optical alignment system.

11. AN ETAP drone system in accordance with claim 10 wherein the processor uses optical flow methodology to align the drone with a ground target consisting of a pattern that is designed to determine the drone orientation relative to a fixed or variable determined destination point.

12. AN ETAP drone system in accordance with claim 11 wherein the determined point is a fixed or variable moving target, host vehicle, ground target or other determined destination point.

13. AN ETAP drone system in accordance with claim 11 wherein the processor is configured to utilize a 2D printed pattern that imparts a 3D special position measurement and wherein the processor is further configured to combine the 3D position measurement with a GPS to maintain an operator determined position relative to the fixed or variable moving target, host vehicle, ground target or other determined destination point.

14. AN ETAP drone system in accordance with claim 13 wherein the processor is configured, in the event of a GPS denial or outage environment, to deliver instructions via the server such that the memory storing instructions executable by the processor will cause the generation of a flight mode and/or pattern where optical flow methodology will be employed for maintaining the position and orientation of the drone relative to the fixed or variable moving target, host vehicle, ground target or other determined destination point.

15. A method comprising: (a) receiving and transmitting command and telemetry information to an ETAP drone system from a ground payload, power and interface unit through a detachable tether unit; (b) providing electrical power to a propulsion system for a drone which is a part of the ETAP drone system; (c) receiving and transmitting a signal from an event detection sensor which is a part of an event detection system; and (d) controlling the drone flight, stability and position through detachable tether; and further comprising transmitting command information to a winch control system configured to control a winch operatively coupled to the detachable tether unit to ensure that the tether unit does not become entangled with objects foreign to an operating environment; in which the winch control system controls a constant slip ring apparatus having a spinning side and a stationary side together.

16. A method comprising: (a) receiving and transmitting command and telemetry information to an ETAP drone system from a ground payload, power and interface unit through a detachable tether unit; (b) providing electrical power to a propulsion system for a drone which is a part of the ETAP drone system; (c) receiving and transmitting a signal from an event detection sensor which is a part of an event detection system; and (d) controlling the drone flight, stability and position through detachable tether; and further comprising generating of a flight mode and/or pattern whereby the drone automatically follows a moving ground control station or equipment associated therewith through the use of a differential GPS and optical alignment system and providing instructions to the drone through a computer server that includes a processor and a memory, the memory storing instructions executable by the processor such that the server is configured to generate the flight mode.

17. A method in accordance with claim 16 in which the generated flight mode comprises optical flow methodology to align the drone with a ground target consisting of a pattern that is designed to determine the drone orientation relative to a fixed or variable determined destination point.

18. A method in accordance with claim 17 in which the generated flight mode utilizes a 2D printed pattern that imparts a 3D special position measurement and wherein the processor combines the 3D position measurement with a GPS to maintain an operator determined position relative to the fixed or variable moving target, host vehicle, ground target or other determined destination point.

* * * * *